United States Patent [19]

Thayne et al.

[11] Patent Number: 5,650,891
[45] Date of Patent: Jul. 22, 1997

[54] APPARATUS FOR PERFORMING MULTIPLE FUNCTIONS IN A DATA STORAGE DEVICE USING A SINGLE ELECTRO-MECHANICAL DEVICE

[75] Inventors: Mark S. Thayne, West Point; Carl F. Nicklos, Ogden, both of Utah

[73] Assignee: Iomega Corporation, Roy, Utah

[21] Appl. No.: 324,808

[22] Filed: Oct. 18, 1994

[51] Int. Cl.⁶ .............................. G11B 17/04; G11B 19/18
[52] U.S. Cl. .................................. 360/99.06; 360/99.02; 369/77.2
[58] Field of Search .................... 360/99.06, 99.07, 360/99.02, 99.03, 98.04, 98.06, 105; 369/75.1, 75.2, 77.1, 77.2

[56] References Cited

U.S. PATENT DOCUMENTS

| | | | |
|---|---|---|---|
| 4,419,703 | 12/1983 | Gruczelak et al. | 360/99.06 |
| 4,445,157 | 4/1984 | Takahashi | 360/133 |
| 4,507,770 | 3/1985 | Tanaka | 369/77.2 |
| 4,571,646 | 2/1986 | Bauck et al. | 360/99.09 |
| 4,651,240 | 3/1987 | Okita et al. | 360/99.06 |
| 4,656,542 | 4/1987 | Shibata | 360/99.06 |
| 4,683,506 | 7/1987 | Toldi et al. | 360/105 |
| 4,816,944 | 3/1989 | Tezuka | 360/99.06 |
| 4,866,551 | 9/1989 | Kishimoto et al. | 360/99.06 |
| 4,953,042 | 8/1990 | Yoshikawa | 360/96.5 |
| 4,965,685 | 10/1990 | Thompson et al. | 360/97.01 |
| 5,060,101 | 10/1991 | Isomura | 360/99.06 |
| 5,204,793 | 4/1993 | Plonczak | 360/97.01 |
| 5,262,918 | 11/1993 | Tannert | 360/133 |
| 5,278,819 | 1/1994 | Shimegi et al. | 369/215 |
| 5,317,464 | 5/1994 | Witt et al. | 360/99.08 |

FOREIGN PATENT DOCUMENTS

| | | | |
|---|---|---|---|
| 63-214962 | 9/1988 | Japan. | |
| 63-298860 | 12/1988 | Japan | 360/99.06 |
| 3-12852 | 1/1991 | Japan. | |
| 4-61063 | 2/1992 | Japan | 360/99.06 |
| 5-12779 | 1/1993 | Japan. | |
| 5-205381 | 8/1993 | Japan. | |
| WO93/18507 | 9/1993 | WIPO. | |

OTHER PUBLICATIONS

Godwin, J., "An Introduction to the Insite 325 FLOPTICAL® Disk Drive", Optical Data Storage Topical Meeting, SPIE vol. 1078 (1989).

*Primary Examiner*—Stuart S. Levy
*Assistant Examiner*—David L. Ometz
*Attorney, Agent, or Firm*—Woodcock Washburn Kurtz Mackiewicz & Norris

[57] ABSTRACT

A data storage device for receiving a removable disk cartridge comprises first and second members movably mounted in the data storage device, each performing a respective function within the disk drive. A first spring coupled to the first movable member biases that member in a first direction. A second spring coupled to the second movable member biases that member in the same direction. A single, electro-mechanical device, which has a drive shaft capable of moving between extended and retracted positions, is mounted in the data storage device. The first and second movable members are arranged with respect to the drive shaft such that an operating end of the drive shaft engages and moves the second member a predetermined distance to an intermediate position of the drive shaft before engaging the first member. A first current applied to the electro-mechanical device moves the drive shaft against the biasing force of the second spring, but is insufficient to move the drive shaft against the combined forces of both springs. Thus, only the second member is moved upon application of the first current. A second, larger current moves the drive shaft against the biasing force of both springs, thus causing the first member to move. By selectively applying the two currents, the second member can be moved independently of the first member.

27 Claims, 12 Drawing Sheets

APPARATUS FOR PERFORMING MULTIPLE FUNCTIONS IN A DATA STORAGE DEVICE USING A SINGLE ELECTRO-MECHANICAL DEVICE

BACKGROUND

1. Field of the Invention

The present invention relates to a data storage device of the type that accepts a removable disk cartridge, and more particularly, to a low cost mechanism for performing multiple functions in a data storage device.

2. Description of the Prior Art

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the cartridge. When the cartridge is inserted into a data storage device, e.g., disk drive, a spindle motor in the drive engages with the disk hub in order to rotate the disk within the cartridge. The outer shell of the cartridge typically has some form of opening near its forward edge to provide the recording heads of the drive with access to the recording surfaces of the disk. A shutter or door mechanism is often provided to cover the opening when the cartridge is not in use to prevent dust or other contaminants from entering the cartridge and settling on the recording surface of the disk.

Data storage devices, e.g. disk drives, for receiving removable disk cartridges perform a number of functions incident to the recording and/or retrieval of information from a disk cartridge. For example, two very critical functions are: (i) to latch or hold the cartridge in place during operation, releasing and ejecting the cartridge only at an appropriate time and only under certain conditions, and (ii) locking the read/write heads of the disk drive in place to prevent movement of the heads under inappropriate circumstances. Prior art disk drives typically treat these and other functions separately, often including multiple electro-mechanical devices to perform each function. Use of multiple electro-mechanical devices increases the cost and complexity of these prior art disk drives. Cost concerns sometimes force the data storage device designer to include manually operated mechanisms that may make the data storage device less user-friendly. Consequently, there is a need for a data storage device, or disk drive, having apparatus for performing multiple functions in a simpler, more cost effective manner. The present invention satisfies this need.

SUMMARY OF THE INVENTION

The present invention is directed to a data storage device, or disk drive, for receiving a removable disk cartridge. According to the present invention, the data storage device of the present invention comprises first and second members movably mounted in the data storage device. Each movable member is adapted to perform a respective function within the disk drive. A first spring is coupled to the first movable member for biasing the first movable member in a first direction, and a second spring is coupled to the second movable member for biasing the second movable member in the same direction. The first spring has a stronger biasing force than the second spring. A single electro-mechanical device having a drive shaft adapted to move from an extended position to a retracted position in response to an electrical current is mounted in the data storage device. The drive shaft has an operating end adapted to engage the first and second movable members and to move the members against their respective biasing forces as the drive shaft moves along a path of travel from its extended position to its retracted position. The operating end of the drive shaft is adapted to engage the second member and to move the second member a predetermined distance to an intermediate position of the drive shaft before engaging the first member. The electro-mechanical device is responsive to a first current sufficient to move the drive shaft against the biasing force of the second spring but insufficient to move the drive shaft against the biasing force of the first spring. The electro-mechanical device is responsive to a second current, greater than the first current, that is sufficient to move the drive shaft against the combined biasing forces of both springs.

When an electrical signal having the first current is applied to the electro-mechanical device, the drive shaft of the device will begin to move from its extended position toward its retracted position. Because the first current is sufficient to overcome the biasing force of the second spring, the operating end of the drive shaft will engage the second movable member and begin to move the second member against its biasing force. However, when the drive shaft reaches an intermediate position in which the operating end of the drive shaft begins to engage the first movable member, the drive shaft will stop since the first current is insufficient to overcome the biasing force of the first spring. In this manner, the first current can be applied to move the second member independently of the first member.

When it is desired to move the first member, the second current can be applied to the electro-mechanical device. Because the second current is sufficient to overcome the combined biasing forces of the first and second springs, the operating end of the drive shaft will move past the intermediate position to its fully retracted position, thereby moving the first movable member against the biasing force of the first spring.

Preferably, the single electro-mechanical device comprises a single solenoid having a single drive shaft with an operating end. Additionally, in a preferred embodiment of the present invention, the first movable member and the second movable member each have a respective projection formed thereon. The respective projections are disposed relative to the operating end of the drive shaft such that, during movement of the drive shaft from its extended position to its retracted position, the drive shaft engages the projection on the second movable member and moves the second movable member a predetermined distance to the intermediate position of the drive shaft prior to engaging the projection on the first movable member. Preferably, a portion of the drive shaft of the electro-mechanical device is cut-away to form a channel in which the projections on the first and second movable members can move. This allows the first and second movable members to be operated independently of the operating end of the drive shaft.

In one implementation of the present invention, the data storage device includes an eject member that engages with the disk cartridge and moves from a forward position to a rearward position upon insertion of the disk cartridge into the device, and an actuator movably mounted within the data storage device for moving a read/write head of the data storage device over a recording medium in the disk cartridge. In this implementation, the first movable member comprises an eject latch lever adapted to releasably latch the eject member in the rearward position to maintain the disk cartridge in the data storage device. The second movable member comprises a head locking lever operative to releasably engage the actuator to lock the actuator in place and prevent movement thereof.

The foregoing and other objects, features and advantages of the invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENTS

Figure 1:
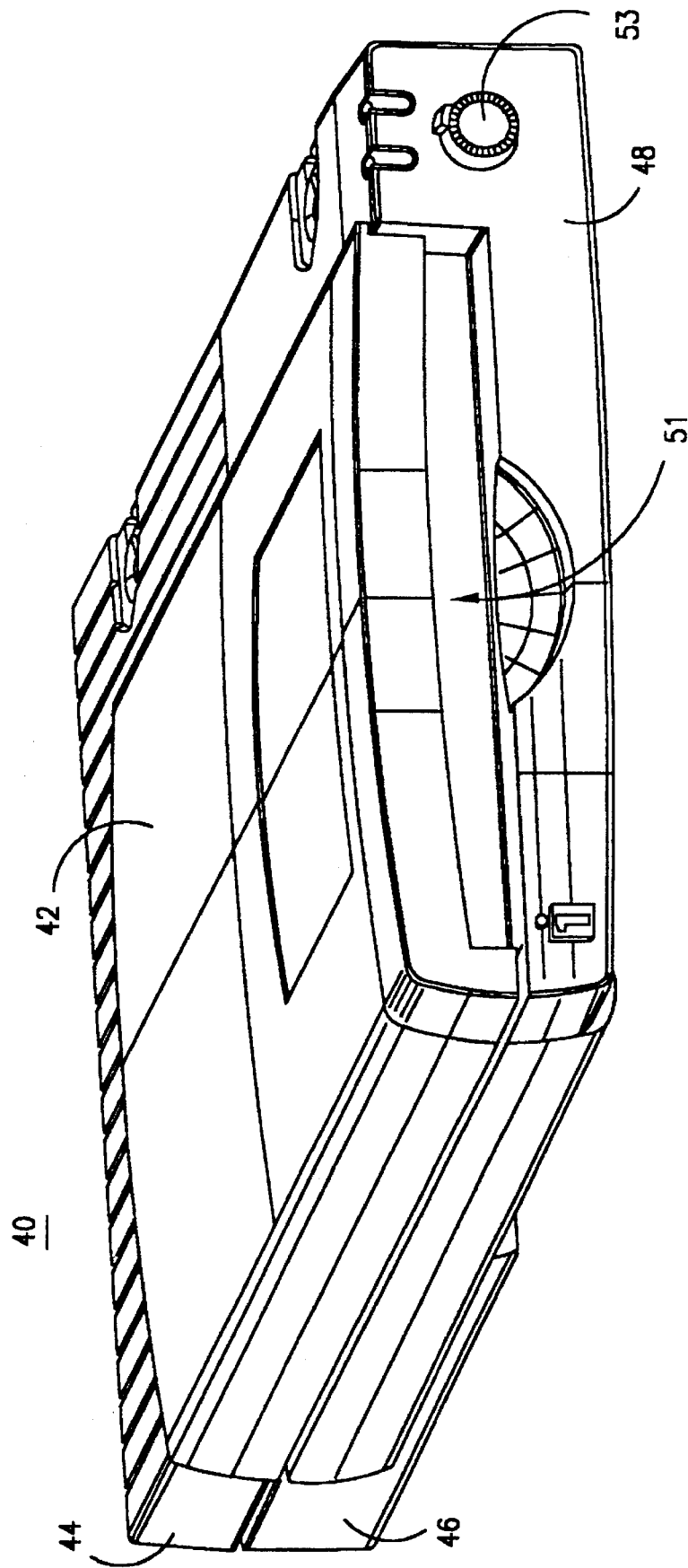
FIG. 1 is a perspective view of a data storage device, or disk drive, in which the present invention is embodied.

Referring to the drawings wherein like numerals indicate like elements throughout, there is shown in FIG. 1 a data storage device, or disk drive 40, in which the present invention is embodied. As shown, the disk drive 40 comprises an outer housing 42 having top and bottom covers 44, 46 and a front panel 48. A disk cartridge can be inserted into the disk drive 40 through a horizontal opening 51 in the front panel 48 of the disk drive 40. An eject button is also provided on the front panel for automatically ejecting a disk cartridge from the disk drive 40. The disk drive 40 can be employed as a stand-alone unit, or alternatively, can be employed as an internal disk drive of a computer (not shown).

Figure 2:
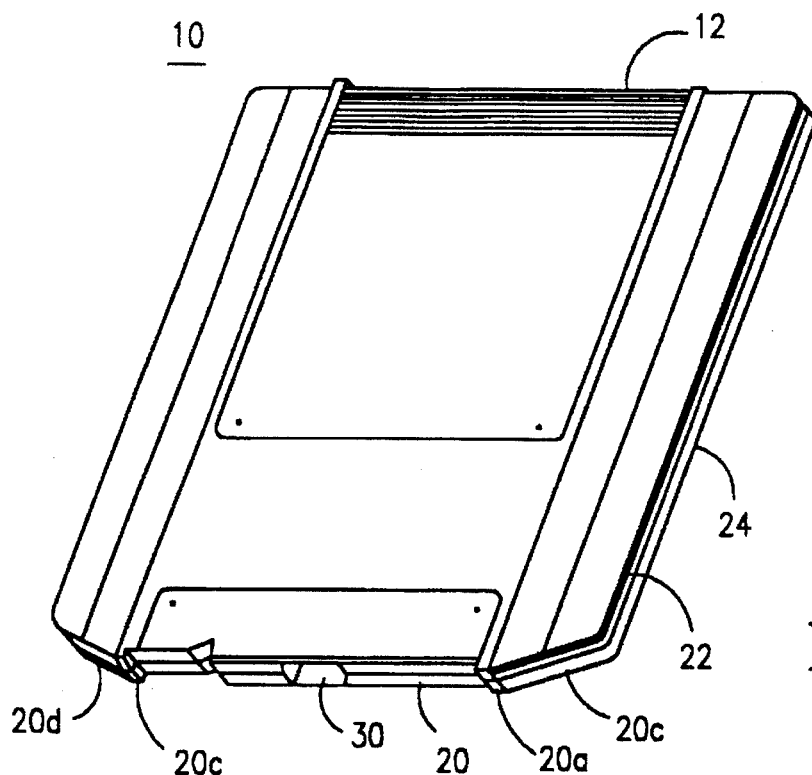
FIG. 2 is a perspective view of a disk cartridge for use with the disk drive of the FIG. 1.
Figure 3:
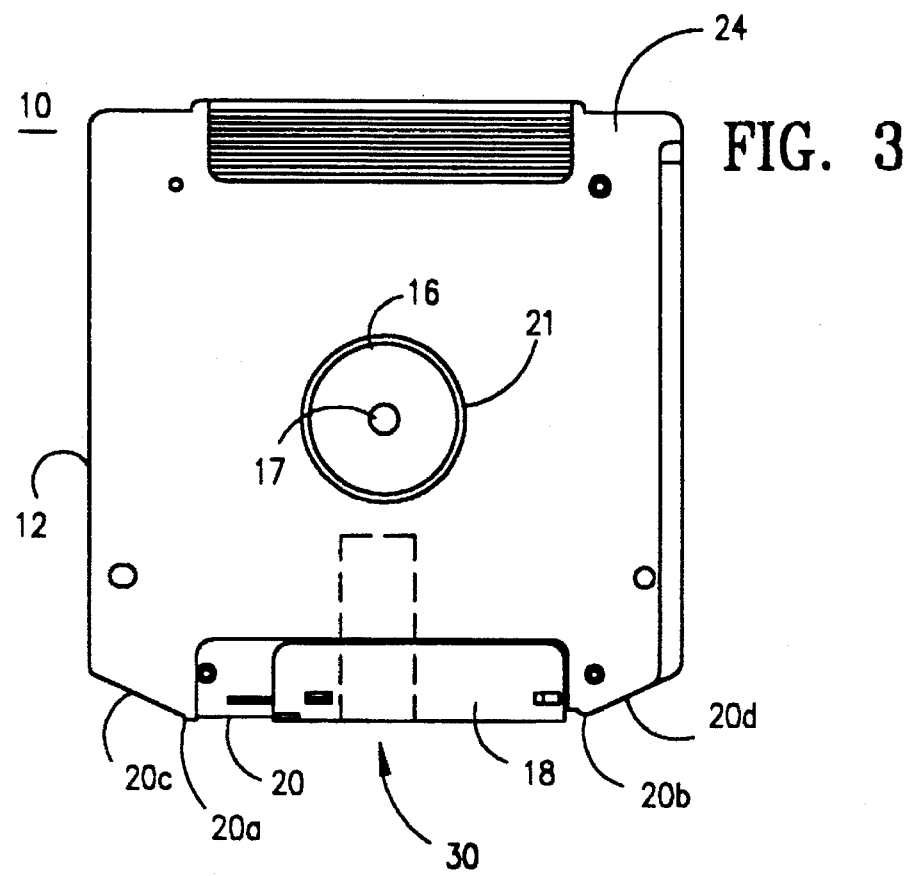
FIG. 3 is a bottom view of the disk cartridge of FIG. 2.

FIGS. 2 and 3 show an exemplary disk cartridge 10 adapted for use in the disk drive 40 of FIG. 1. As shown, the disk cartridge 10 comprises an outer casing 12 having upper and lower shells 22, 24 that mate to form the casing. A disk-shaped recording medium (not shown) is affixed to a hub 16 that is rotatably mounted in the casing 12. An opening 21 on the bottom shell 24 of the casing 12 provides access to the disk hub 16. A head access opening 30 in the front peripheral edge 20 of the disk cartridge 10 provides access to the recording surfaces of the disk (not shown) by the recording heads of the disk drive. A shutter 18 (not shown in FIG. 2) is provided on the front peripheral edge 20 of the disk cartridge 10 to cover the head access opening 30 when the cartridge is not in use. When the cartridge is inserted into the disk drive, the shutter 18 moves to the side exposing the head access opening 30 and thereby providing the heads of the drive with access to the recording surface of the disk (not shown ). In the present embodiment, the casing houses a flexible or floppy magnetic disk, however, in other embodiments, the disk may comprise a rigid magnetic disk, a magneto-optical disk or an optical storage medium.

The opposite front corners of the disk cartridge 10 have a non-square shape defined by angled surfaces 20c, 20d that angle away from the front peripheral edge 20 of the cartridge at a predetermined angle. Additionally, a pair of projections 20a, 20b are formed on the front peripheral edge 20 of the cartridge. Each projection 20a, 20b is formed adjacent a respective one of the angled surfaces 20c, 20d at the point where the respective surface 20c, 20d begins to angle away from the plane of the front peripheral edge 20 of the cartridge 10.

Figure 4:
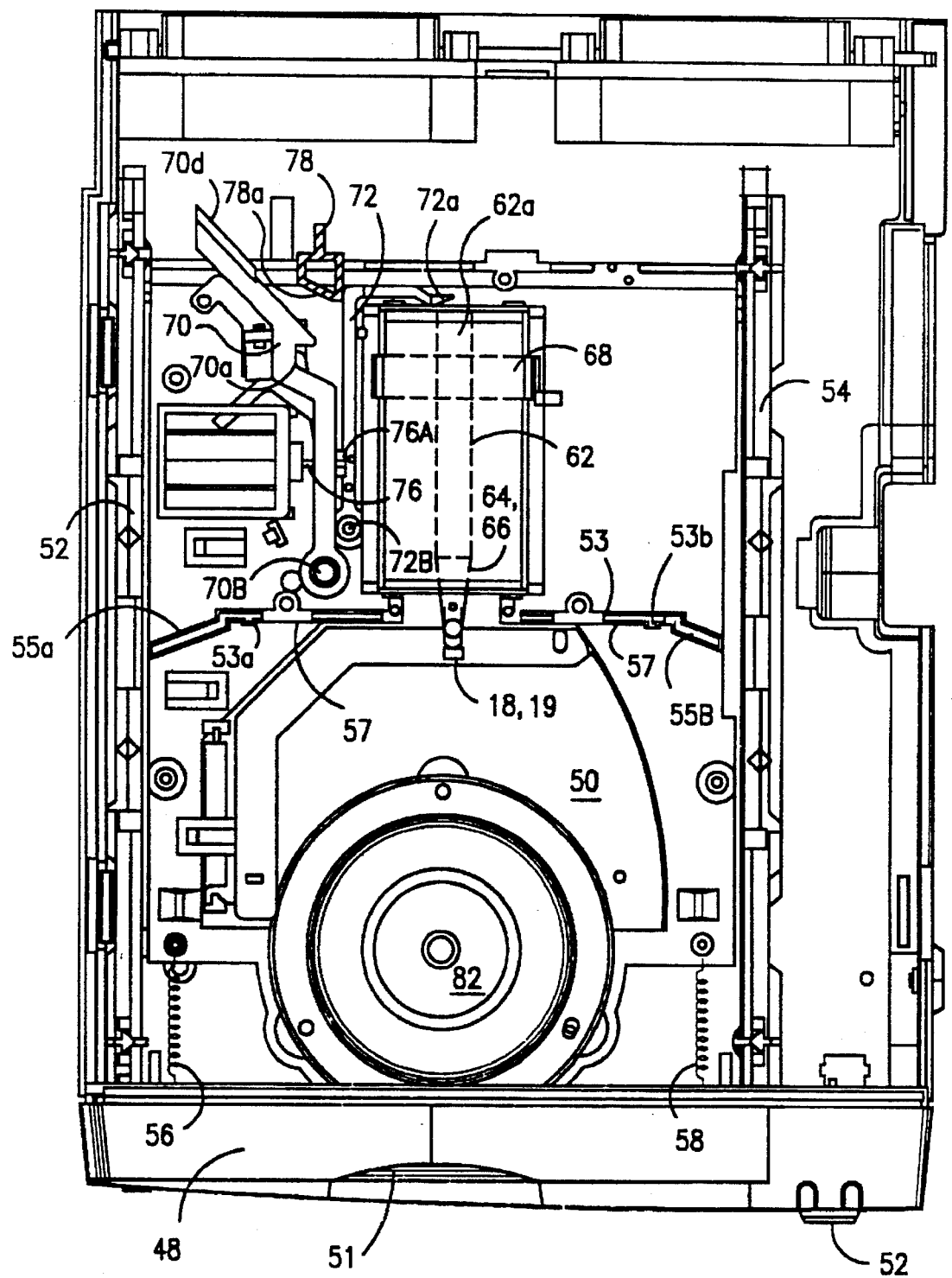
FIG. 4 is a top view of the data storage device of FIG. 3 with a top cover of the device housing removed.
Figure 7:
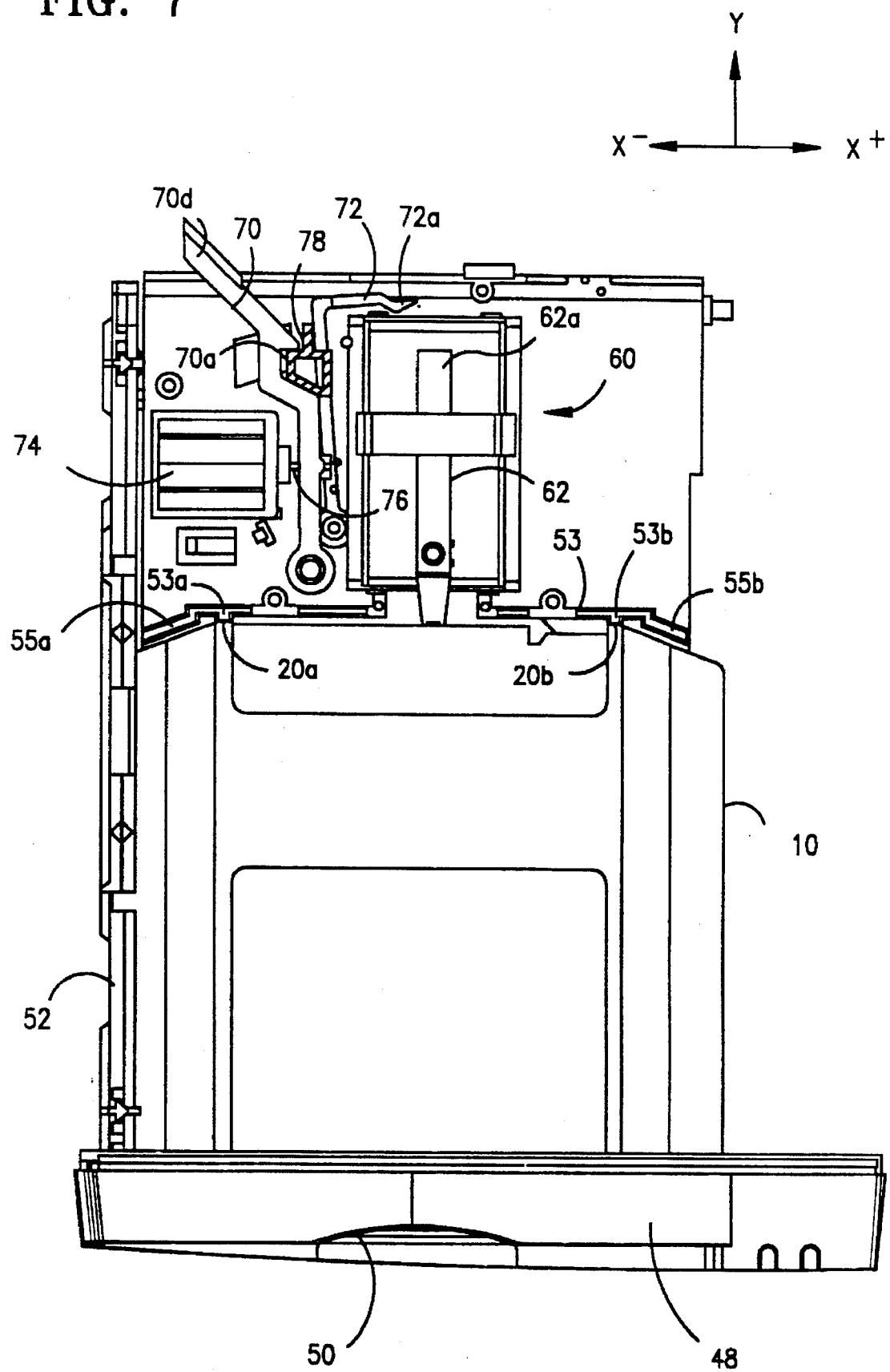

FIG. 4 is a top view of the disk drive 40 of FIG. 1 with the top cover 44 removed. The disk drive 40 comprises an internal platform 50 that slides along opposing side rails 52, 54 between a forward position (FIG. 4) and a rearward position (FIG. 7). A pair of springs 56, 58 bias the platform 50 toward its forward position.

Figure 14:
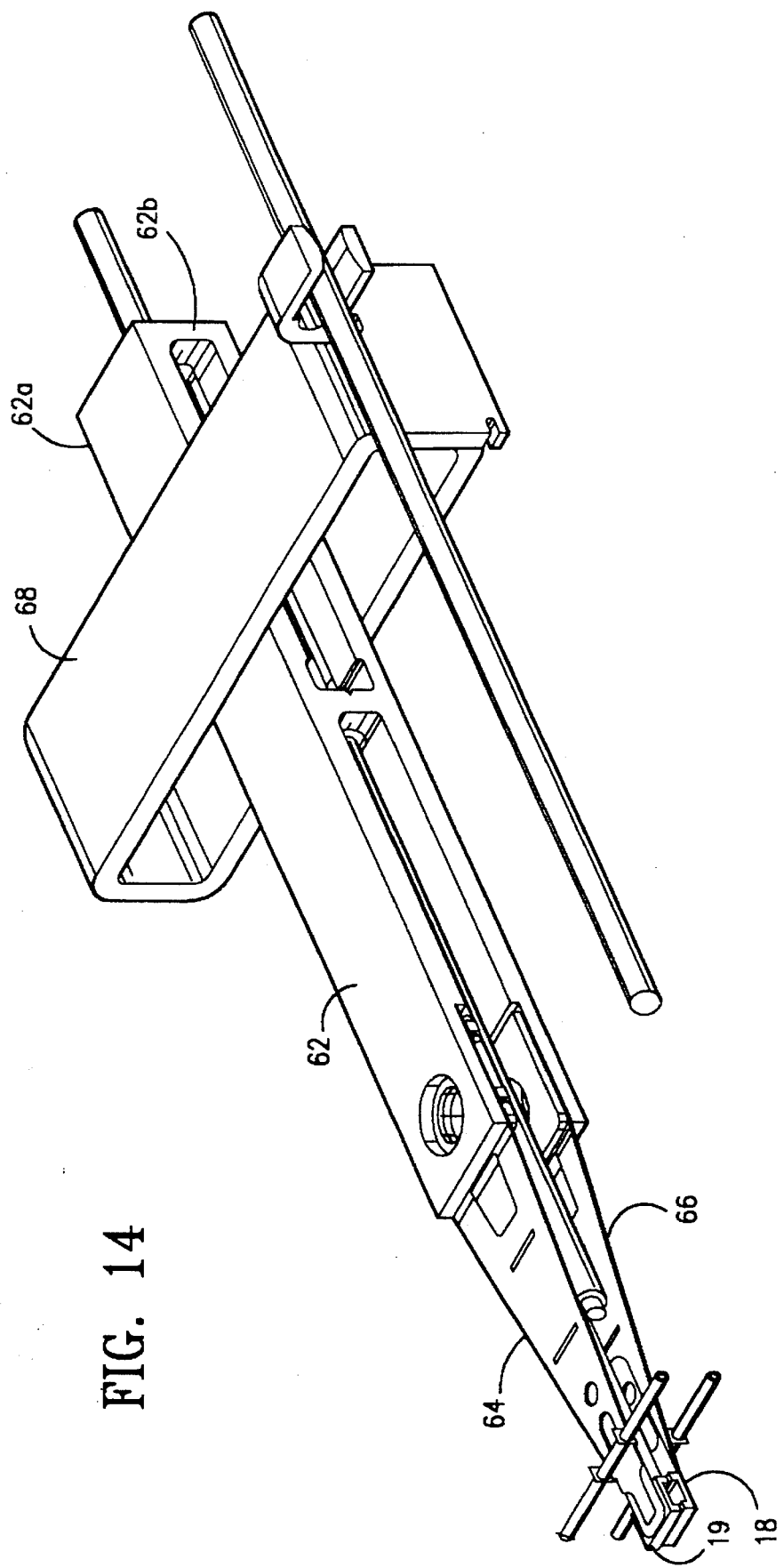
FIG. 14 is a perspective view of the actuator of the data storage device.

An actuator 60, which in the preferred embodiment comprises a linear actuator, is mounted to the rear of the platform 50. The linear actuator 60 comprises a carriage assembly 62 having two lightweight flexible arms 64, 66. The recording heads 18, 19 of the disk drive are mounted at the ends of the respective arms 64, 66. A coil 68, which is part of a voice coil motor, is mounted at the opposite end of the carriage 62. The coil 68 interacts with magnets (not shown) to move the carriage linearly so that the heads 18 and 19 can move radially over respective recording surfaces of a disk cartridge inserted into the disk drive. Additional details of the linear actuator 60 are provided in co-pending application Ser. No. 08/324,599, filed concurrently herewith, entitled "Actuator for Data Storage Device", which is incorporated herein by reference. FIG. 14 is a perspective view showing further details of the actuator 60.

A raised wall 53 is formed on the platform. The raised wall 53 extends across the width of the platform 50, perpendicularly to the direction of motion of the carriage 62. The raised wall 53 defines an eject member that engages the front peripheral edge 20 of the disk cartridge 10 upon insertion of the disk cartridge into the disk drive. The opposite side edges 55a, 55b of the eject member 53 are angled in the same manner as the opposite front corners 20c, 20d of the disk cartridge 10. Thus, the shape of the eject member 53 mirrors the contour of the forward end face of the cartridge. As further shown, the front surface 57 of the eject member 53 has a pair of projections 53a, 53b positioned near the angled surfaces 55a, 55b.

The disk drive 40 further comprises a spindle motor 82 capable of rotating the recording medium of a disk cartridge at a predetermined operating speed. In the present embodiment, the spindle motor 82 is coupled to the platform 50. As described hereinafter, when a disk cartridge is inserted into the disk drive, the hub 16 of the disk cartridge engages the spindle motor 82 of the disk drive 40 when the platform reaches its rearward position.

According to the present invention, as embodied in the disk drive 40 illustrated herein, the disk drive 40 comprises a first movable member movably mounted in the disk drive for performing a respective function. In the embodiment described herein, the first movable member comprises an eject latch lever 70 movably mounted within the disk drive 40. As described hereinafter, the eject latch lever 70 functions to releasably latch the platform 50 in its rearward position. In the present embodiment, the eject latch lever 70 is pivotally mounted on the platform 50 about a rotation shaft 70b. A first spring 90 (FIGS. 8–10) is coupled to the eject latch lever 70 (i.e., first movable member) at the rotation shaft 70b in order to bias the lever 70 in a first direction (e.g., the $X^+$ direction). The eject latch lever 70 has a cutout 70a adapted to releasably engage a latch projection 78 as the platform 50 (see FIG. 6) moves backward into its rearward position. The biasing force of the first spring 90 urges the eject latch lever 70 into this latched position. In the preferred embodiment, the latch projection 78 is formed as part of the top cover 44 (not shown) of the disk drive 40.

Further in accordance with the present invention, the disk drive 40 comprises a second movable member movably mounted within the disk drive 40. In the embodiment described herein, the second movable member comprises a head locking lever 72 that is pivotally mounted on the platform 50 about a rotation shaft 72b. As described hereinafter, the head locking lever 72 functions to lock and unlock the carriage 62 of the linear actuator 60. A second spring 92 (FIGS. 8–10) is coupled to the head locking lever 72 (i.e., second movable member) at its rotation shaft 72b to bias the head locking lever 72 in the same direction as the eject latch lever 70 (i.e., the $X^+$ direction). An end 72a of the head locking lever, which extends at a right angle to the main shaft of the lever 72, is adapted to releasably engage an end 62a of the actuator carriage 62 when the carriage 62 is in a fully retracted position, thereby locking the carriage in place and preventing inadvertent movement of the recording heads 18, 19.

A single electro-mechanical device, which in the preferred embodiment comprises a solenoid 74, is mounted on the platform 50 and has a drive shaft 76. When the solenoid 74 is energized by an electrical current, the drive shaft 76 moves in the $X^-$ direction from a normally extended position toward a retracted position. As the drive shaft 76 of the solenoid 74 moves toward its retracted position, an enlarged operating end 76a of the drive shaft 76 engages the first and second movable members (e.g., eject latch and head locking levers 70, 72) in order to pull the members in the $X^-$ direction against the respective biasing forces of the first and second springs 90, 92. Additional details of the structure and operation of the solenoid 74 and the movable members in accordance with the present invention are provided hereinafter with reference to FIGS. 9–12.

Figure 5:
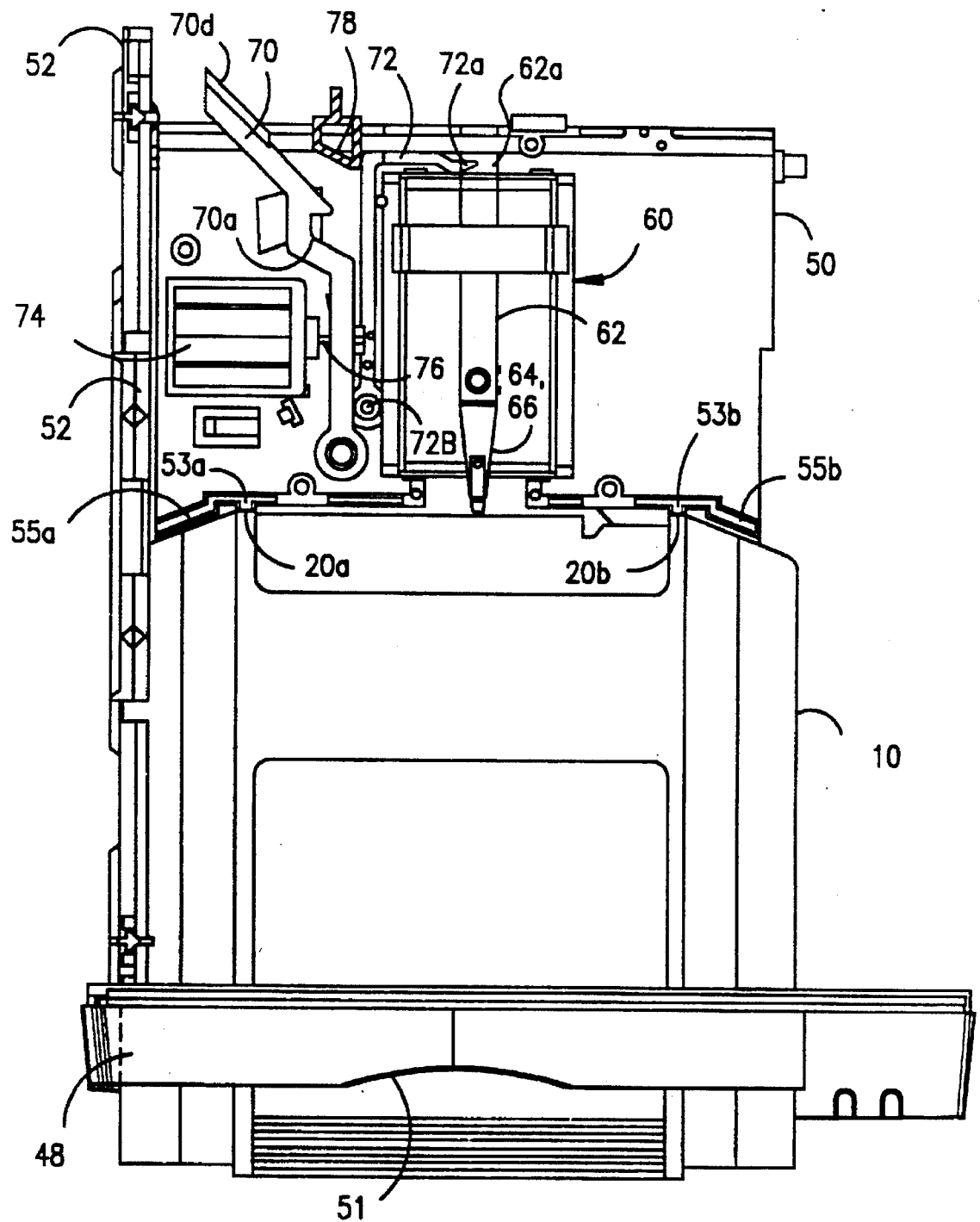
FIGS. 5–7 are top views of the data storage device of FIG. 4 illustrating the insertion of a disk cartridge into the device.
Figure 6:
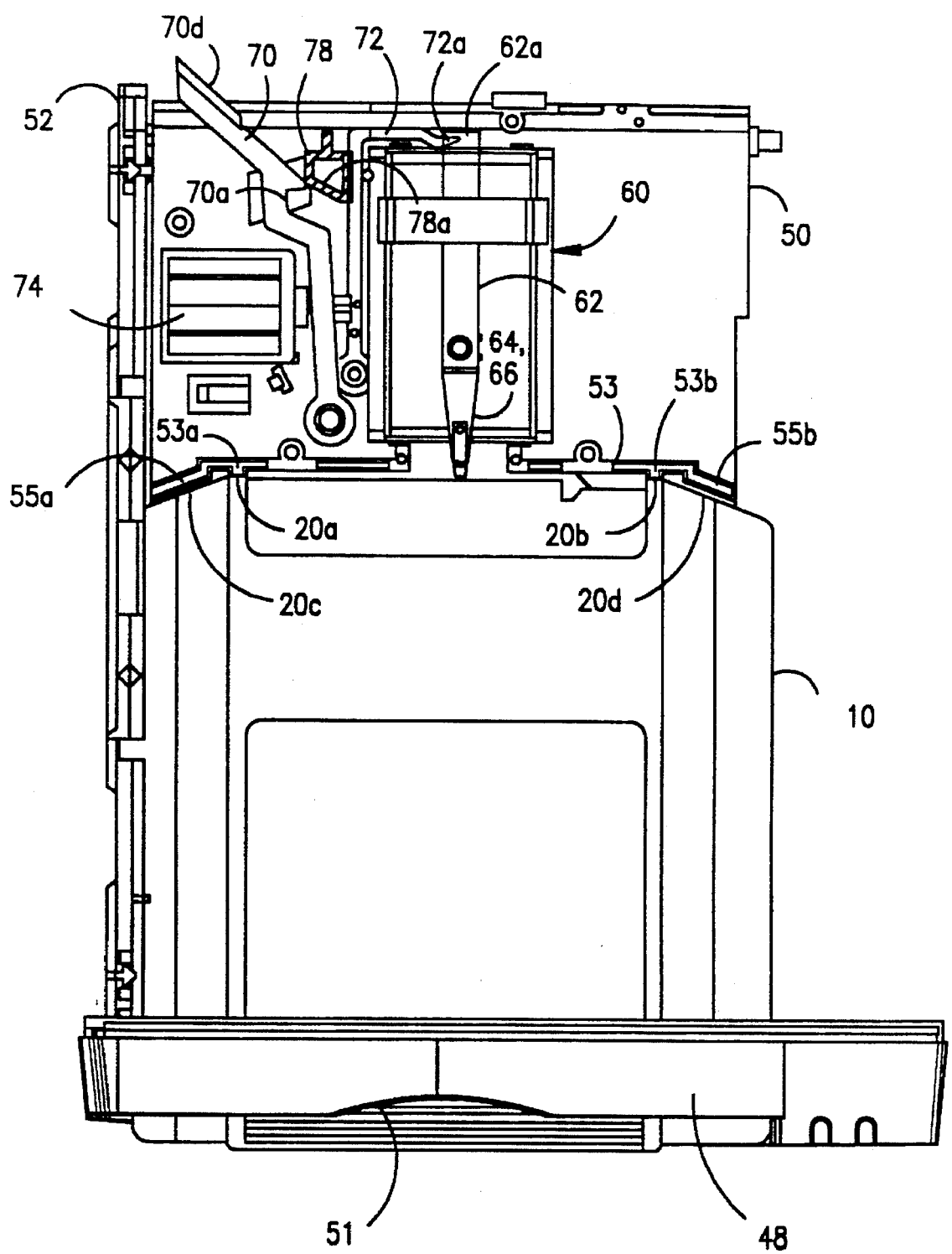

FIGS. 5–7 illustrate the insertion of a disk cartridge 10 into the disk drive 40. For purposes of illustration only, some components of the disk drive 40 are not shown. Referring to FIG. 5, a disk cartridge 10 is inserted into the disk drive 40 through the opening 51 in the front panel 48 of the disk drive 40. Initially, the platform 50 is in its forward position, as shown. As the disk cartridge 10 is pushed farther into the disk drive 40, the pair of projections 20a, 20b on the forward end 20 of the cartridge 10 engage the corresponding pair of projections 53a, 53b on the front surface of the eject member 53 of the platform 50. Thereafter, the disk cartridge 10 and platform 50, including the eject member 53, move together rearwardly against the biasing force of the springs 56, 58 (FIG. 4).

The platform 50 rides in slots (not shown) along the opposing side rails 52, 54. The slots (not shown) in the opposing side rails 52, 54 are contoured such that, as the platform 50 and disk cartridge 10 move rearwardly, the elevation of the platform 50 changes. Specifically, the platform 50 rises in order to bring the spindle motor 82 of the disk drive 40 into engagement with the hub 16 of the disk cartridge 10. Engagement of the hub 16 and spindle motor 82 is completed when the platform 50 reaches its final rearward position (FIG. 7).

Referring to FIG. 6, as the platform 50 approaches its rearward position, the portion of the eject latch lever 70 just rearward of the cutout 70a contacts an angled surface 78a of the latch projection 78. As the disk cartridge 10 pushes the platform 50 farther to the rear of the disk drive, the eject latch lever 70 rides along the angled surface 78a pushing the eject latch lever 70 to the side (i.e., $X^-$ direction) against its normal spring bias. As shown in FIG. 7, when the platform reaches its full rearward position, the eject latch lever 70 springs back in the $X^+$ direction such that the cutout 70a engages the latch projection 78. This latches the platform 50, and hence the eject member 53, in its rearward position and maintains the disk cartridge 10 in the disk drive 40. In this manner, the eject latch lever is said to be self-latching.

It is understood that in other embodiments, the eject member 53 may be formed separately from the platform 50 and the platform 50 may be stationary. In such embodiments, the eject member 53 alone will move from the forward position to the rearward position, and the eject latch lever 70 will be adapted to latch the eject member 53 in its rearward position. In still other embodiments, the platform 50 may be omitted. The present invention, as defined by the appended claims, is intended to cover all such embodiments.

Figure 8:
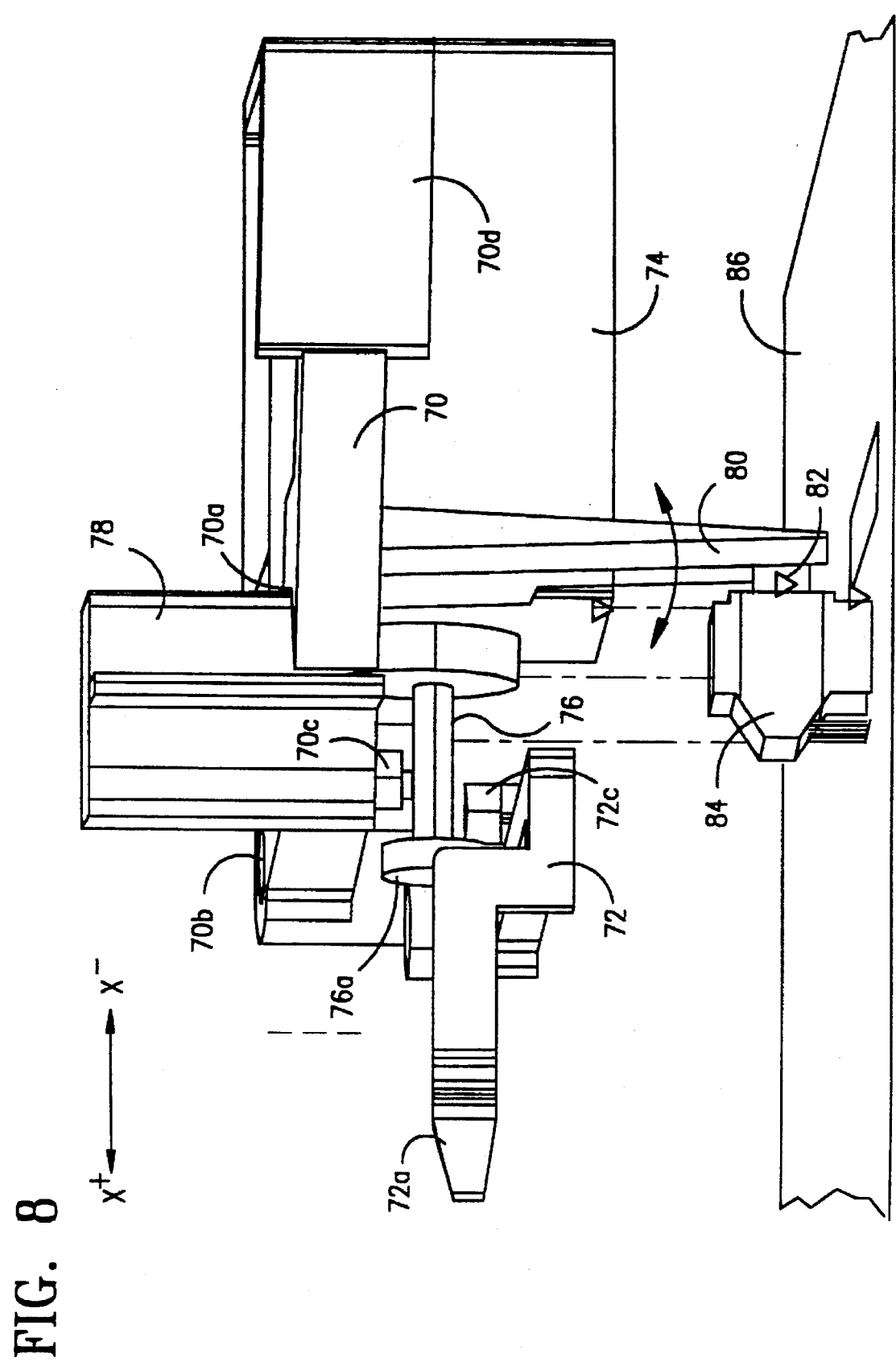
FIG. 8 illustrates further details of a portion of the data storage device of FIG. 3.

FIG. 8 is a rear end view of the disk drive 40 illustrating the latched position of the eject lever 70. As shown, the eject lever 70 has an elongate, downwardly extending projection 80 that extends downwardly from the lever 70 toward a circuit board 86 mounted on the bottom cover 46 of the disk drive housing. A switch 84 having a plunger 82 is mounted on the circuit board 86. When the platform 50 reaches the rearward position and the cutout 70a engages the latch projection 78, the projection 80 extending from the eject lever 70 will move against the plunger 82 thereby activating the switch 84. A controller (not shown) in the disk drive can sense the activation of the switch 84 and be alerted that the platform 50 has moved into the latched, rearward position. The controller can then initiate rotation of the spindle motor and can signal the solenoid 74 to move the head locking lever 72 and release the linear actuator. As described in co-pending application Ser. No. 08/324,671, filed concurrently herewith, entitled "Disk Cartridge and Data Storage Device for Receiving Same", which is incorporated herein by reference, the disk drive may further comprise apparatus for detecting whether a disk cartridge is indeed present in the disk drive after movement of the platform 50 into its rearward position is detected via switch 84.

Referring now to FIGS. 9–12, the structure and operation of the solenoid 74 and the first and second movable members (i.e., levers 70, 72) in accordance with the present invention will be described in greater detail. According to the present invention, the single solenoid 74 is adapted to move the first and second members independently in order to selectively perform their respective functions. In the present embodiment, the solenoid is adapted to move the eject latch lever 70 (i.e., first member) and head locking lever 72 (i.e., second member) in order to selectively unlatch the platform 50 and/or unlock the carriage of the head actuator 53. It is understood that the eject latch and head locking levers 70, 72 represent merely one implementation of the present invention. In other embodiments, the first and second movable members may comprise other movable components adapted to perform other disk drive functions. The following discussion of the operation of the eject latch and head locking levers 70, 72 is intended merely to illustrate one exemplary implementation of the present invention in a data storage device and is not intended to be limiting.

According to the present invention, each of the movable members (i.e., eject latch and head locking levers 70, 72) has a small projection 70c, 72c positioned in the path of movement of the enlarged end 76a of the solenoid shaft 76. As the drive shaft 76 of the solenoid moves in the X⁻ direction from its normally extended position (FIG. 9) to its fully retracted position (FIG. 11), the enlarged end 76a of the drive shaft engages with the respective projections 70c, 72c on the levers 70, 72, moving the levers 70, 72 against the respective biasing forces of the first and second springs 90, 92.

Figure 9:
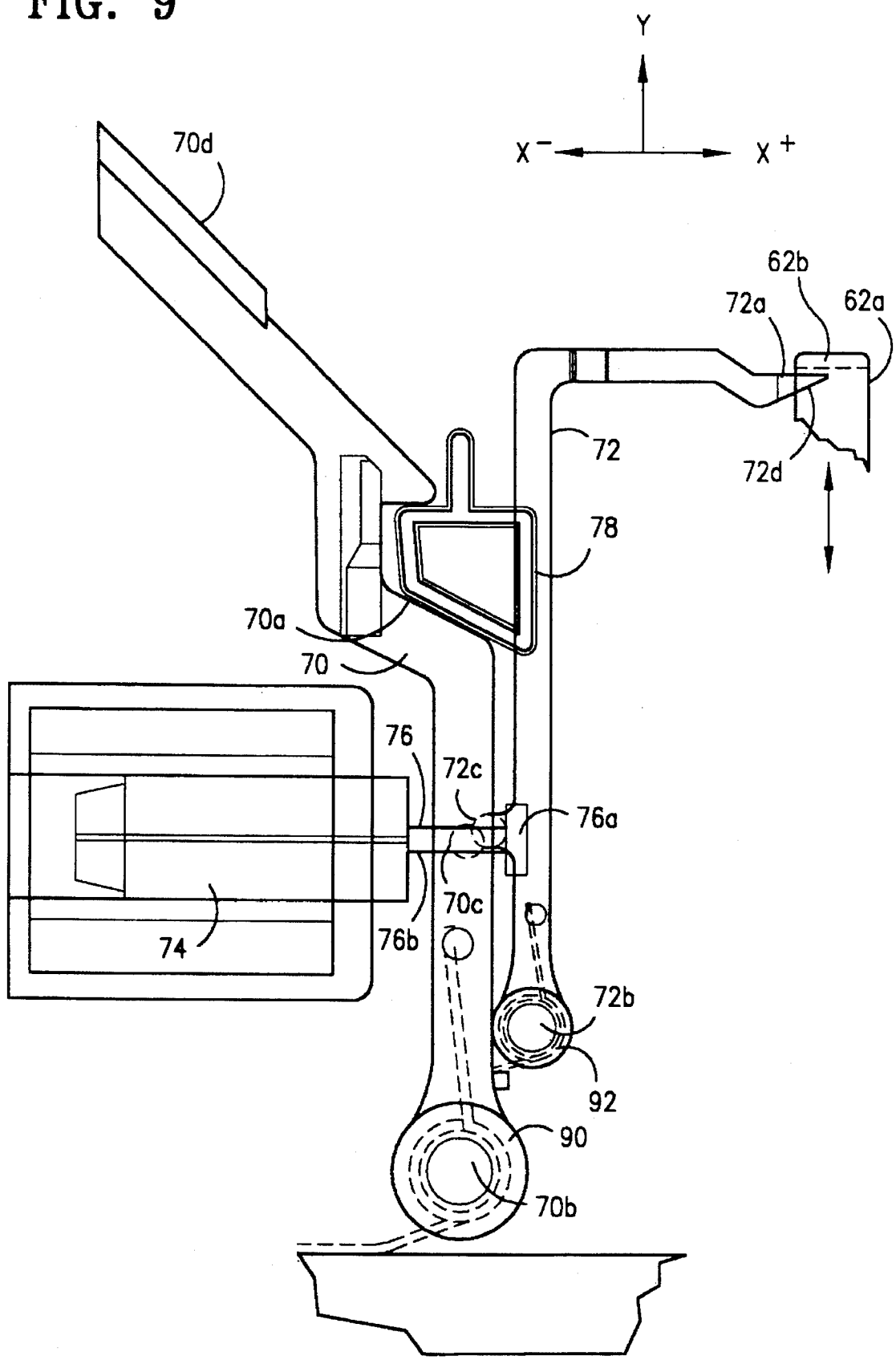
FIGS. 9–12 illustrate further details of the operation of a first movable member and a second movable member in accordance with the present invention.
Figure 12:
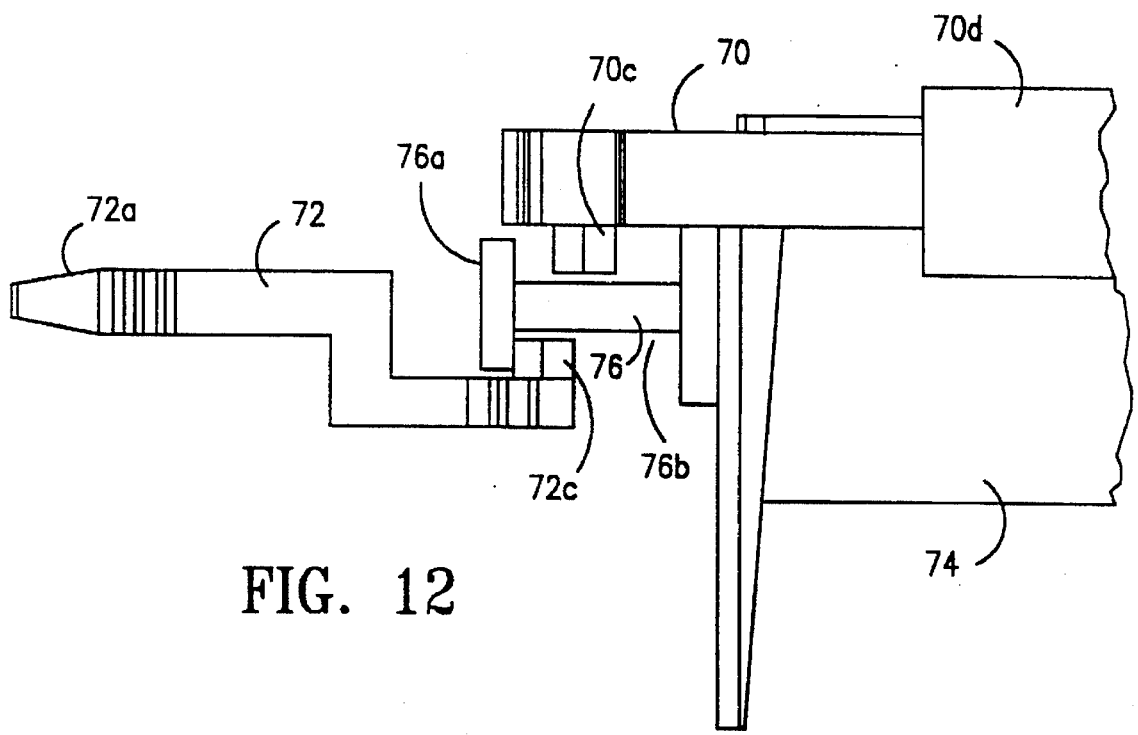

As best shown in FIGS. 9 and 12, the respective projections 70c, 72c are positioned relative to the enlarged end 76a of the drive shaft 76 such that the end 76a of the drive shaft will contact the projection 72c on the head locking lever 72 (i.e., first movable member) first and will move the head locking lever 72 a predetermined distance to an intermediate position (FIG. 10) of the drive shaft 76 before engaging the projection 70c on the eject lever 70. As such, the head locking lever 72 can be moved independently of the eject lever 70.

Figure 10:
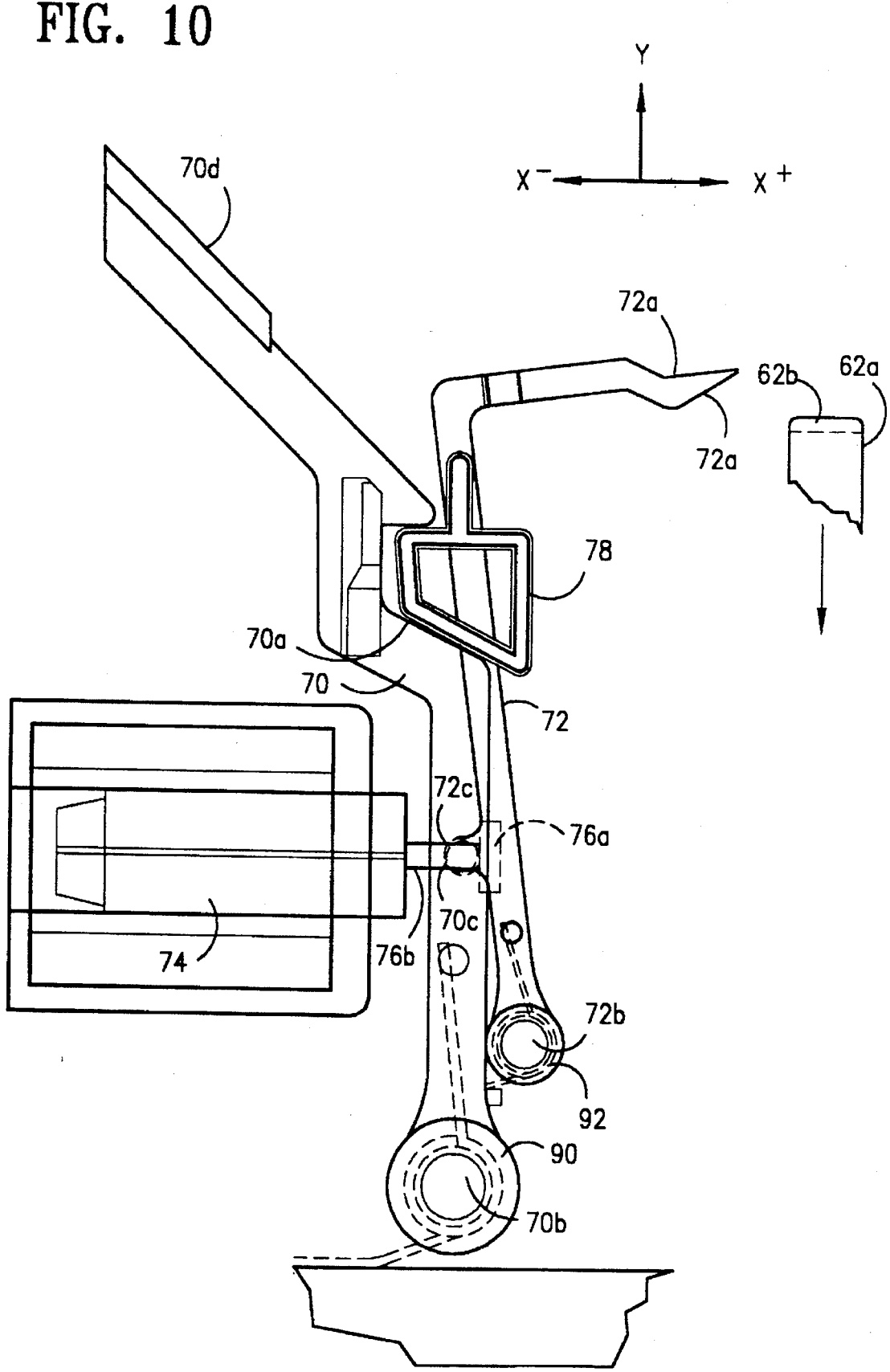

According to an important feature of the present invention, the biasing force of the first spring 90 is greater than the biasing force of the second spring 92. Preferably, the biasing force of the first spring is approximately ten (10) times the biasing force of the second spring. As such, the solenoid 74 can be energized with an electrical signal having a first current (e.g., 400 mA) that is sufficient to move the drive shaft 76 of the solenoid 74 against the biasing force of the second spring 92 but is insufficient to move the drive shaft 76 against the biasing force of the first spring 92. As shown in FIG. 10, when it is desired to unlock the carriage 62 of the head actuator 60, an electrical signal having this first current can be applied to the solenoid 74 causing the drive shaft 76 of the solenoid 74 to move in the X⁻ direction pulling the head locking lever 72 out of engagement with the end 62a of the actuator carriage 62. However, because the first current is insufficient to overcome the biasing force of the first spring 90, the drive shaft 76 will stop moving when the enlarged end 76a of the drive shaft 76 reaches its intermediate position and contacts the projection 70c on the eject latch lever 70. Thus, in this case, the head locking lever 72 moves to a disengaged position, while the eject lever 70 remains in its latched position. Once the actuator carriage 62 has moved forward and begun its normal operation, the first current can be removed from the solenoid 74 allowing the drive shaft 76 of the solenoid 74 to move back to its extended position (FIG. 9). At the same time, the second spring 92 will urge the head locking lever 72 back to the position shown in FIG. 9.

Like the eject latch lever 70, the head locking lever 72 is self-latching or self-engaging. That is, when the head locking lever 72 is in the position shown in FIG. 9 and the rear end 62a of the carriage 62 moves back toward the rear of the disk drive, the rear end 62a will contact an inclined surface 72d at the end 72a of the lever 72. As the carriage 62 moves farther to the rear, the end 62a of the carriage will ride along the inclined surface 72d of the head locking lever 72 causing the head locking lever 72 to move to the side against the bias of spring 92. Once the carriage 62 reaches its full rearward position, the head locking lever 72 will spring back to its engaged position, and the carriage 62 will once again be locked in place, as illustrated in FIG. 9. More specifically, as shown in FIG. 9, the end 72a of the head locking lever 72 locks the carriage 62 in place (i.e., engages the carriage 62) by blocking the rear end surface 62b (see FIG. 14) of the carriage 62. It is desirable to lock the carriage in place whenever the disk drive 40 is not in use, or a disk cartridge has been removed from the disk drive 40.

Figure 11:
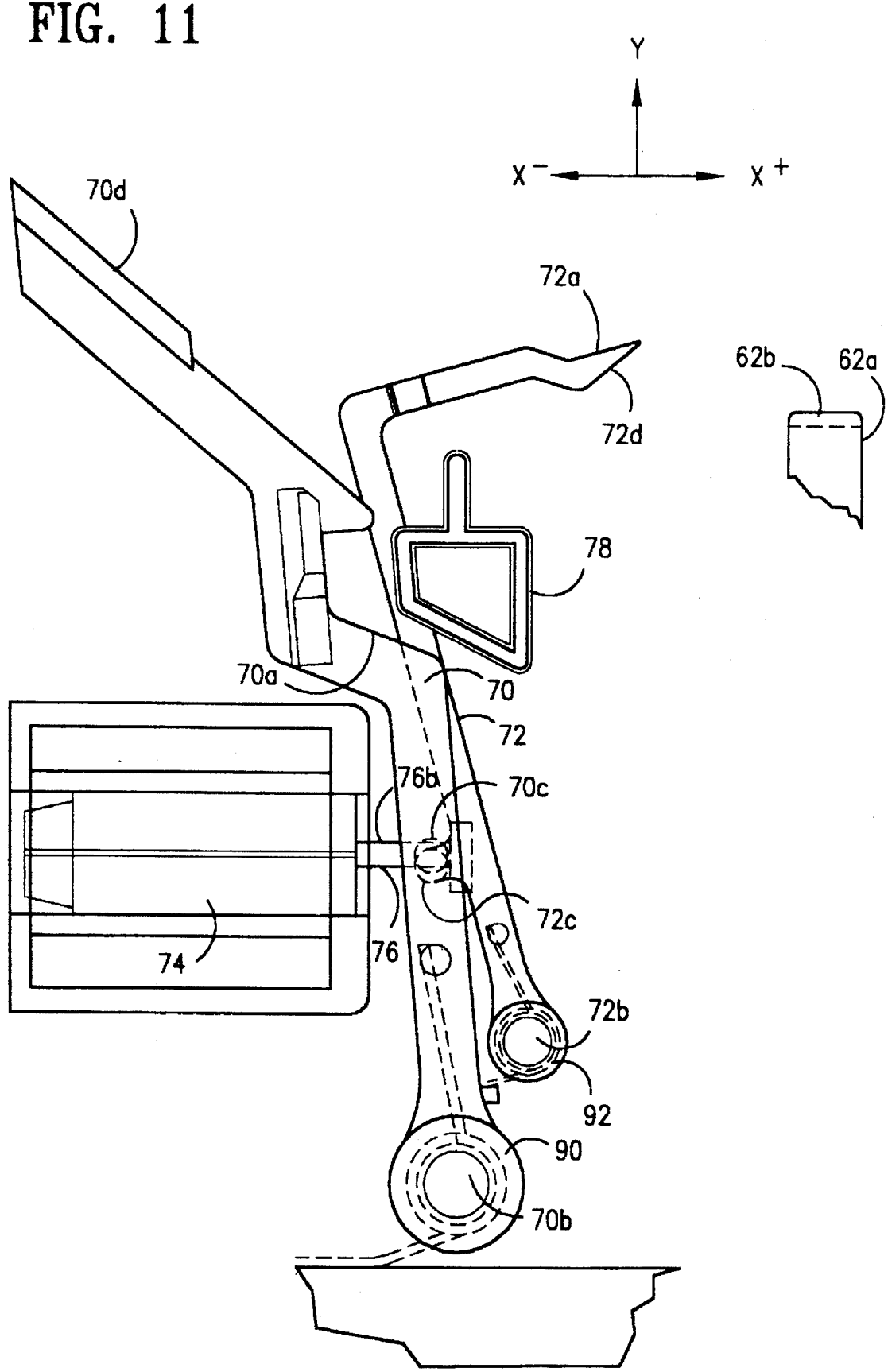

Referring now to FIG. 11, when it is desired to eject a disk cartridge from the disk drive, the eject button 52 on the front panel 48 of the disk drive 40 is pushed. A processor (not shown) in the disk drive detects the activation of the eject button and applies an electrical signal to the solenoid 74 having a second, stronger current (e.g., 1.2 Amps) that is sufficient to overcome the combined biasing force of both the springs 90, 92. In this case, the drive shaft 76 of the solenoid 74 moves from its extended position to its fully retracted position. As the drive shaft 76 moves to its fully retracted position, the enlarged operating end 76a of the drive shaft engages the projections 70c, 72c on both levers 70, 72 pulling both levers in the X⁻ direction. This causes the cutout 70a on the eject latch lever 70 to disengage from the latch projection 78, thereby releasing the platform 50 (i.e., eject member 53). Once released, the platform 50 moves back to its forward position under the force of springs 56, 58. As the platform 50 moves back to the forward position, the disk cartridge is backed out of the opening 51 and can then be removed by a user. Immediately after unlatching the platform 50, the second current is removed from the solenoid 74 so that the eject latch lever 70 and head locking lever 72 spring back to the positions shown in FIG. 5. The magnitudes of the first and second currents required to overcome the biasing forces of the first and second springs are highly dependent on the characteristics of the particular solenoid employed. The foregoing values are simply exemplary.

As the foregoing illustrate, the present invention provides a means for operating two (or more) movable members in a data storage device to perform two (or more) functions using only a single electro-mechanical device. This capability results from (i) the placement of each movable member relative to the operating end 76a of the drive shaft 76, (ii) the application of different strength biasing forces to each movable member, and (iii) the selective application of electrical signals of different strengths (e.g., currents) to the solenoid. As mentioned above, the present invention may be employed in any data storage device and in any capacity to perform multiple functions in the disk drive using only a single electro-mechanical device.

According to another feature of the present invention, at least a portion of the length of the solenoid drive shaft 76 is cut-away, or reduced in diameter, to provide a channel 76b in which the respective projections 70c, 72c of the first and second movable members (i.e., eject latch and head locking levers 70,72) can move independently of the enlarged operating end 76a of the drive shaft 76. It is this channel 76b that permits movement of the levers 70, 72 during their respective self-latching operations.

Additionally, the channel 76b permits manual operation of the eject latch lever 76b in the event that power to the disk drive 40 or solenoid 74 is interrupted or turned off. When power to the disk drive 40 or solenoid 74 is not available and it is desired to unlatch the platform 50 from its rearward, latched position, a thin rod like instrument, such as a straightened paper clip or the like, can be inserted through a small hole (not shown) in the rear end of the disk drive housing 42. The inserted end of the instrument will contact the inclined surface 70d of the eject latch lever. This will cause the eject latch lever 70 to move to the side until the cutout 70a disengages from the latch projection 78. The platform 50 will therefore spring back to its forward position. All the while, the head locking lever 72 will remain in its engaged position.

Figure 13:
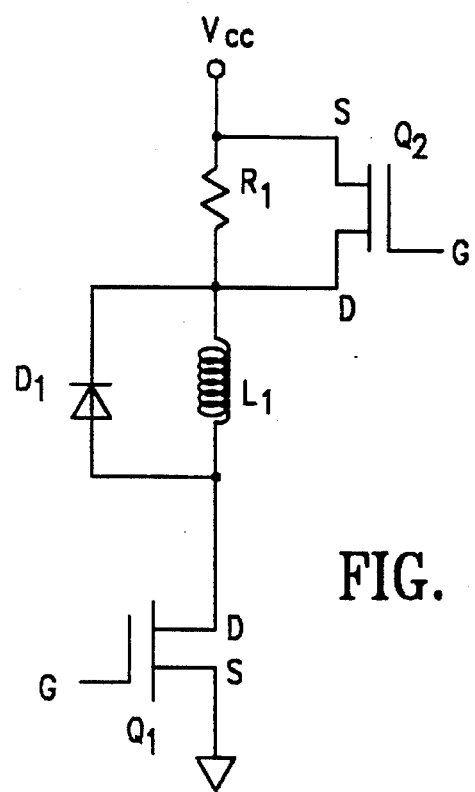
FIG. 13 is a circuit for applying two different currents to a solenoid.

FIG. 13 is a diagram of an exemplary circuit for applying two different electrical currents, i.e., the first and second currents described above, to an electro-mechanical device, such as the solenoid 74. $Q_1$ is an N-channel MOSFET, and $Q_2$ is a P-channel MOSFET. $L_1$ is the coil of the solenoid 74. $D_1$ is a fly-back diode. $R_1$ is a resistor that limits current in the circuit.

To apply a first (i.e., lower) current to the solenoid 74, the gate (G) of $Q_1$ and the gate (G) of $Q_2$ are both pulled high to Vcc. When the gate of $Q_2$ is pulled high, $Q_2$ is turned off and the solenoid current is limited by $R_1$. To apply a second, greater current to the solenoid 74, the gate of $Q_1$ is pulled high to Vcc, and the gate of $Q_2$ is pulled low to ground. $Q_2$ effectively shunts $R_1$ when the gate of $Q_2$ is pulled to ground. Thus, a greater current is applied to the coil $L_1$ of the solenoid. The solenoid current can be brought to zero by pulling the gate of $Q_1$ to ground, thus turning off $Q_1$.

As the foregoing illustrates, the present invention is directed to a data storage device having apparatus for performing multiple disk drive functions using only a single electro-mechanical device. By achieving these functions using only a single electro-mechanical device, the overall cost and complexity of the disk drive are reduced. The present invention may be employed in any data storage device and is by no means limited to uses described herein. For example, the present invention may be employed in a disk drive that has either a stationary platform, or no platform at all. Additionally, the present invention may be employed in a disk drive that has a rotary actuator as opposed to the linear actuator 60 shown and described herein. Thus, it is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. An apparatus for use in a data storage device comprising:
    a first movable member movably mounted in the data storage device;
    a second movable member movably mounted in the data storage device;
    a first spring coupled to said first movable member for biasing said first movable member in a first direction;
    a second spring coupled to said second movable member for biasing said second movable member in said first direction, said first and second springs having respective biasing forces; and
    a single electro-mechanical device having a drive shaft that moves from a first position to a second position, the drive shaft having an operating end that engages said first and second movable members and moves said members against the respective biasing forces of the first and second springs as the drive shaft moves from said first position to said second position, said operating end engaging said second member and moving said second member a predetermined distance to an intermediate position of said drive shaft before engaging said first member,
    said electro-mechanical device being responsive to a first current sufficient to move the drive shaft against the biasing force of said second spring but insufficient to move the drive shaft against the combined biasing forces of the first and second springs, and being responsive to a second current, greater than the first current, sufficient to move the drive shaft against the combined forces of the first and second springs,
    whereby the first and second currents can be selectively applied to said electro-mechanical device to move said drive shaft between said first, intermediate and second positions to thereby move said second member independently of said first member.

2. The apparatus recited in claim 1 wherein said single electro-mechanical device comprises a single solenoid having said single drive shaft with said operating end.

3. The apparatus recited in claim 1 wherein said first movable member and said second movable member each have a respective projection formed thereon, and wherein the respective projections are disposed relative to the operating end of the drive shaft such that, during movement of the drive shaft from said first position to said second position, the drive shaft engages the projection on the second movable member and moves the second movable member said predetermined distance to said intermediate position of the drive shaft prior to engaging the first movable member.

4. The apparatus recited in claim 3 wherein a portion of the drive shaft of the electro-mechanical device is cut-away to form a channel in which the projections on the first and second movable members can move independently of the operating end of the drive shaft.

5. The apparatus recited in claim 1 wherein said first movable member comprises an eject latch lever, and wherein said second movable member comprises a head locking lever.

6. The apparatus recited in claim 1 further comprising:
    an eject member that engages with a disk cartridge and moves from a forward position to a rearward position upon insertion of the disk cartridge into the device; and
    an actuator movably mounted within said data storage device for moving a read/write head of the data storage device over a recording medium in the disk cartridge,
    said first movable member comprising an eject latch lever that releasably latches said eject member in said rearward position to maintain said disk cartridge in said data storage device,
    said second movable member comprising a head locking lever operative to releasably engage said actuator to lock said actuator in place and prevent movement thereof.

7. The data storage device recited in claim 1 wherein the biasing force of the first spring is stronger than the biasing force of the second spring.

8. The data storage device recited in claim 1 further comprising means for selectively applying one of said first and second currents to said electro-mechanical device.

9. The data storage device recited in claim 1 wherein said first position of said drive shaft comprises an extended position thereof, and wherein said second position of said drive shaft comprises a retracted position thereof.

10. A data storage device for receiving a removable disk cartridge comprising:
    an eject member that engages with the disk cartridge and moves from a forward position to a rearward position upon insertion of the disk cartridge into the device;
    an actuator movably mounted within said data storage device for moving a read/write head of the data storage device over a recording medium in the disk cartridge;
    an eject latch lever movably mounted in said data storage device, said eject latch lever being operable to move between a latched position in which the eject latch lever engages the eject member and latches the eject member in said rearward position to maintain said disk cartridge in said data storage device, and an unlatched position in which the eject member is released;

a first spring coupled to said eject latch lever for biasing said eject latch lever in a first direction toward said latched position;

a head locking lever movably mounted in said data storage device, said head locking lever being operative to move between an engaged position in which the head locking lever engages the actuator and locks the actuator in place to prevent movement thereof, and a disengaged position in which the actuator is released;

a second spring coupled to said head locking lever for biasing said head locking lever in said first direction toward said engaged position; and a single electro-mechanical device having a drive shaft that moves from an extended position to a retracted position, the drive shaft having an operating end that engages said eject latch lever and said head locking lever and moves said levers against the respective biasing forces of the first and second springs as the drive shaft moves from said extended position to said retracted position, said operating end engaging said head locking lever and moving said head locking lever a predetermined distance to an intermediate position of said drive shaft before engaging said elect latch lever, said electro-mechanical device being responsive to a first current sufficient to move the drive shaft against the biasing force of said second spring but insufficient to move the drive shaft against the combined biasing forces of the first and second springs, and being responsive to a second current, greater than the first current, sufficient to move the drive shaft against the combined biasing forces of the first and second springs, whereby the first and second currents can be selectively applied to said electro-mechanical device to move said head locking lever independently of said eject latch lever.

11. The data storage device of claim 10 wherein the eject latch lever has a cutout formed therein that engages with a latch projection fixedly disposed on a housing of the data storage device in order to latch said eject member in said rearward position, said eject latch lever being operable to move out of engagement with said latch projection to release said eject member.

12. The data storage device recited in claim 10 wherein the eject latch lever is self-latching.

13. The data storage device recited in claim 10 wherein the head locking lever is self-engaging.

14. The data storage device recited in claim 10 further comprising a movable platform, said eject member being formed as part of said movable platform.

15. The data storage device recited in claim 14 wherein said actuator, said eject latch lever and said head locking lever are each movably mounted on said platform.

16. The data storage device recited in claim 15 wherein said eject latch lever and said head locking lever are each pivotally mounted on said platform.

17. The data storage device recited in claim 10 wherein said single electro-mechanical device comprises a single solenoid having said drive shaft with said operating end.

18. The data storage device recited in claim 10 wherein said eject latch lever and said head locking lever each have a respective projection formed thereon, and wherein the respective projections are disposed relative to the operating end of the drive shaft such that, during movement of the drive shaft from said extended position to said retracted position, the drive shaft engages the projection on the head locking lever and moves the head locking lever said predetermined distance prior to engaging the eject latch lever, whereby the head locking lever can be moved independently of the eject latch lever.

19. The data storage device recited in claim 18 wherein a portion of the drive shaft of the solenoid is cut-away to form a channel in which the projection on the eject latch lever can move, whereby the eject latch lever can be moved independently of said head locking lever to latch and unlatch said eject member without moving said head locking lever.

20. Apparatus for performing multiple functions in a data storage device comprising:

a first movable member movably mounted in the data storage device, said first movable member being biased in a first direction with a first biasing force and performing a first function in said data storage device;

a second movable member movably mounted in the data storage device, said second movable member being biased in said first direction with a second biasing force and performing a second function in said data storage device; and a single electro-mechanical device having a drive shaft that moves from an extended position to a retracted position in response to a current applied thereto, the drive shaft having an operating end that engages said first and second movable members and that moves both of said members against the respective first and second biasing forces as the drive shaft moves from said extended position to said retracted position, said operating end engaging said second member and moving said second member a predetermined distance to an intermediate position of said drive shaft before engaging said first member, said electro-mechanical device being responsive to a first current sufficient to move the drive shaft against said second biasing force but insufficient to move the drive shaft against a combination of the first and second biasing forces, and being responsive to a second current, greater than the first current, sufficient to move the drive shaft against the combination of the first and second biasing forces, whereby the first and second currents can be selectively applied to said electro-mechanical device to move said drive shaft between said extended, intermediate and retracted positions to thereby move said second member independently of said first member.

21. The apparatus recited in claim 20 further comprising means for selectively applying one of said first and second currents to said electro-mechanical device.

22. The apparatus recited in claim 20 wherein said first biasing force is provided by a first spring coupled to said first movable member, and wherein said second biasing force is provided by a second spring coupled to said second movable member.

23. The apparatus recited in claim 20 wherein said first biasing force is greater than said second biasing force.

24. The apparatus recited in claim 20 wherein said single electro-mechanical device comprises a single solenoid having said single drive shaft with said operating end.

25. The apparatus recited in claim 20 wherein said first movable member and said second movable member each have a respective projection formed thereon, and wherein the respective projections are disposed relative to the operating end of the drive shaft such that, during movement of the drive shaft from said extended position to said retracted position, the drive shaft engages the projection on the second movable member and moves the second movable member said predetermined distance to said intermediate position of the drive shaft prior to engaging the first movable member.

26. The apparatus recited in claim 25 wherein a portion of the drive shaft of the electro-mechanical device is cut-away to form a channel in which the projections on the first and second movable members can move independently of the operating end of the drive shaft.

27. The apparatus recited in claim 20 wherein said data storage device has an eject member that engages with a disk cartridge and moves from a forward position to a rearward position upon insertion of the disk cartridge into the data storage device, and an actuator movably mounted within said data storage device for moving a read/write head of the data storage device over a recording medium in the disk cartridge, and further wherein:

said first movable member comprises an eject latch lever that releasably latches said eject member in said rearward position to maintain said disk cartridge in said data storage device, and said second movable member comprises a head locking lever operative to releasably engage said actuator to lock said actuator in place and prevent movement thereof.

* * * * *

UNITED STATES PATENT AND TRADEMARK OFFICE
CERTIFICATE OF CORRECTION

PATENT NO. : 5,650,891
DATED : July 22, 1997
INVENTOR(S) : Mark S. Thayne et al

It is certified that error appears in the above-identified patent and that said Letters Patent is hereby corrected as shown below:

Col. 4, line 38, before "which" insert
--now abandoned--.

Signed and Sealed this

Sixth Day of January, 1998

Attest:

BRUCE LEHMAN

*Attesting Officer*        *Commissioner of Patents and Trademarks*